E. W. SHAW.
FULL WAY VALVE.
APPLICATION FILED MAY 19, 1913.

1,136,841. Patented Apr. 20, 1915.

Witnesses:

Inventor
Edward W. Shaw
by
James L. Norris
Attorney

UNITED STATES PATENT OFFICE.

EDWARD WORSTER SHAW, OF BROWN HILL MINE, KALGOORLIE, WESTERN AUSTRALIA, AUSTRALIA.

FULL-WAY VALVE.

1,136,841. Specification of Letters Patent. Patented Apr. 20, 1915.

Application filed May 19, 1913. Serial No. 768,590.

*To all whom it may concern:*

Be it known that I, EDWARD WORSTER SHAW, a subject of the King of Great Britain, residing at Brown Hill Mine, Kalgoorlie, Western Australia, Australia, have invented certain new and useful Improvements in Full-Way Valves, of which the following is a specification.

The present invention has reference to valves for slimes and similar gritty matter, and it comprehends, briefly, an improved valve of this general class or character which comprises a plurality of members designed for relative movement to expand or contract the valve and equipped with renewable packing rings so constructed and arranged as to contact with the valve casing only when the valve is completely seated.

An embodiment of the invention is illustrated in the accompanying drawing, whereof:—

Figure 1:
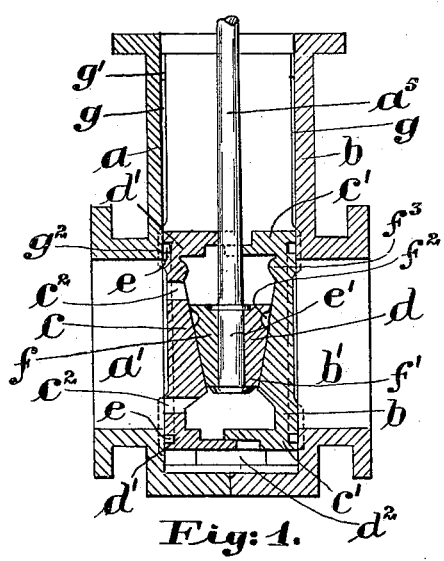
Figure 2:
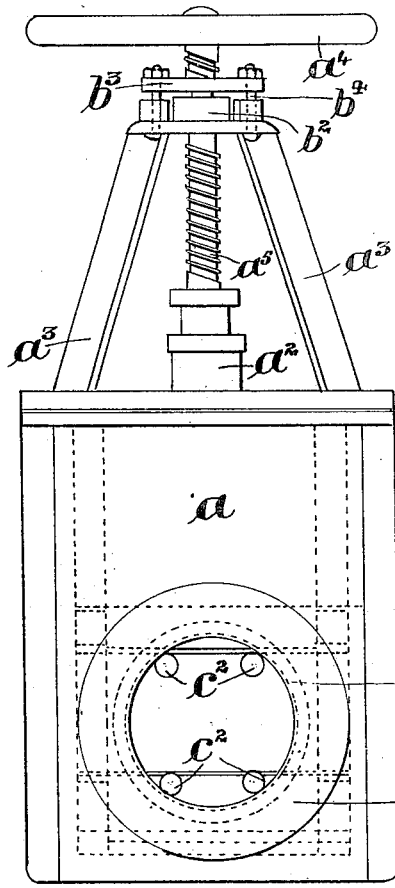
Figure 3:
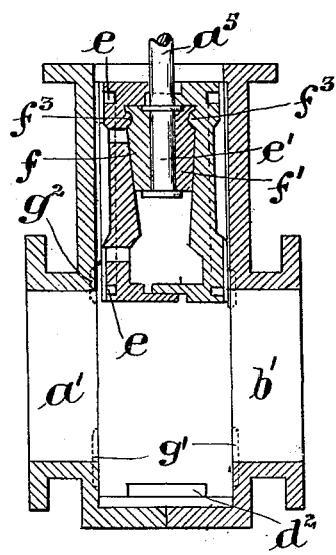

Figure 1 is a vertical sectional view, showing the valve in lowered and expanded position, to close the passageway of the slimes; Fig. 2 is an elevation, looking toward the discharge side of the valve casing; and Fig. 3 is a view similar to Fig. 1, but showing the valve in raised and contracted position.

Referring more particularly to said drawing, it will be seen that the casing of the hereinafter-described valve, as shown, consists of two companion parts or members $a$ and $b$, provided, respectively, with the flanged outlet $a'$ and inlet $b'$. Upon the top of the casing are mounted a gland $a^2$ and standard $a^3$, the head of the latter carrying a nut $b^2$ which is removably held in place by a cap $b^3$ and studs $b^4$. The threaded spindle $a^5$ for operating the valve passes through said cap, nut and gland and is furnished at its upper end with a handle $a^4$, a suitable stop $d^2$ being located upon the floor of the casing to limit the downward movement of the valve. The said valve itself is of square section, and preferably comprises a pair of companion members or cheeks $c$ and $d$, formed at their upper and lower ends with overlapping jaws $c'$ and $d'$, the upper jaws having registering openings for the passage of the spindle $a^5$ therethrough. The inlet end outlet faces of the valve members are provided with renewable rings $e$ of rubber or other packing material which fit in annular grooves formed in said faces, and the outlet member $c$ is also provided with openings $c^2$ to prevent non-frictional contact on the discharge face $c$ of the valve when said face engages the casing $a$. These two members $c$ and $d$ are designed for movement toward or from each other to contract or expand the valve, the latter movements being produced through the agency of a wedge which is arranged between said members and is secured to the lower end $e'$ of the spindle. Like the valve proper and its casing, the wedge is composed of two companion members $f$ and $f'$ which can be readily renewed, and these members are provided adjacent their upper ends with seats or pockets $f^2$ for the reception of similarly-located projecting lugs $f^3$ on the inner faces of the valve members, the said inner faces being tapered so as to enable them to coact in the desired manner with the wedges.

The contraction of the valve members is obtained by the provision of guide strips $g$ which are arranged within the casing at the vertical corner edges thereof, the distance between opposite strips being approximately equal to the width of the valve when contracted. These strips serve both to force the valve members inwardly toward each other during the travel of the valve, and, also, to keep the packing rings $g$ free, and they are provided with seats or depressions $g'$ both at their ends and at their centers, which seats are designed to receive raised portions or shoulders $g^2$ on the upper and lower ends of the side edges of the valve members.

Assuming that the parts are in the position represented in Fig. 1, the operation is substantially as follows:—The spindle $a^5$ is turned by means of its handle $a^4$ and thus raises the wedge $f$ $f'$. During the initial part of its ascent, the wedge moves within and relatively to the valve, until it reaches a position where its top contacts with the upper jaws of the valve members, but thereafter, as the upward movement continues, the wedge and valve are raised together. As soon as the valve starts to move upward, its shoulders $g^2$ are caused to move out of the seats $g'$ in the guides $g$ and to engage and ride over the adjacent portions of the latter, whereupon the valve members are forced inwardly toward each other, thus contracting the valve and removing all pressure from the rings $e$, while at the same time the lugs $f^3$ are caused to enter the pockets $f^2$. During the remainder of their upward movement, the valve and wedge are held in contracted position until the uppermost seats $g'$ are reached by the valve shoulders, at which time the locking action of the guides upon the valve is terminated. To open the passageway through the casing, the rotation of the spindle is reversed, thus causing both the valve and the wedge to descend together, until the bottom of the valve rests upon the stop $d^2$, this being due to the coöperation between the lugs and their pockets which prevents the wedge from being released before the valve strikes against the said stop. As in the upward movement of the parts, the valve is contracted during its descent by reason of the shoulders $g^2$ riding over the lower portions of the guides, such action continuing until the said shoulders are again brought into position to enter the adjacent seats $g'$. At this point, the downward movement of the wedge in and relatively to the valve commences, with the result that the lugs $f^3$ are released and the valve is expanded to its full extent, due to the coöperation between the tapered faces of its two members and of the wedge.

I claim:—

1. The combination, with a valve casing provided with a plurality of opposed, interiorly-located, vertical guides; of a valve movable vertically in said casing and embodying a pair of companion members having external projections and tapered internal faces; an operating rod; and a wedge provided on said rod and disposed between the valve members for movement both in unison with and relatively to the valve and for co-action with said tapered faces, to expand the valve during movement of the wedge in one direction, said projections being arranged to engage and ride over said guides during the vertical movements of the valve, to force the valve members toward each other and contract the valve.

2. The combination, with a valve casing provided with a plurality of opposed, interiorly-located, vertical guides; of a valve movable vertically in said casing and embodying a pair of companion members having external projections and tapered internal faces; an operating rod; and a wedge provided on said rod and disposed between the valve members for movement both in unison with and relatively to the valve and for co-action with said tapered faces, to expand the valve during movement of the wedge in one direction, said wedge and valve members having coöperating means for initially locking the same together to provide for the said movements in unison during the vertical movements of the valve, and said projections being arranged to engage and ride over said guides during said vertical movements, to force the valve members toward each other and contract the valve.

3. The combination, with a valve casing provided with a plurality of opposed, interiorly-located, vertical guides having seats therein at predetermined points; of a valve movable vertically in said casing and embodying a pair of companion members having tapered internal faces; an operating rod; a wedge provided on said rod to expand the valve during movement of the wedge in one direction, said wedge and valve members having coöperating means for initially locking the same together for movement in unison during the vertical movements of the valve; and lateral projections provided on the external faces of the valve members and arranged to engage and travel along said guides during the vertical movements of the valve, to contract said valve and force said coöperating locking means into engagement, said projections being arranged to enter said seats when brought opposite the same during the movements of the valve to release said coöperating locking means.

In testimony whereof I have hereunto set my hand in presence of two subscribing witnesses.

EDWARD WORSTER SHAW.

Witnesses:
RICHARD SPARROW,
FREDERICK CHARLES WALTHAM.